United States Patent
Cho

(10) Patent No.: US 9,677,742 B2
(45) Date of Patent: Jun. 13, 2017

(54) FLEXIBLE DISPLAY DEVICE AND METHOD OF MANUFACTURING COVER WINDOW OF THE SAME

(71) Applicant: SAMSUNG DISPLAY CO., LTD., Yongin, Gyeonggi-Do (KR)

(72) Inventor: Jong-Hwan Cho, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 0 days.

(21) Appl. No.: 14/074,769

(22) Filed: Nov. 8, 2013

(65) Prior Publication Data
US 2014/0140037 A1    May 22, 2014

(30) Foreign Application Priority Data
Nov. 16, 2012  (KR) .................... 10-2012-0130354

(51) Int. Cl.
| F21V 9/14 | (2006.01) |
| B29C 37/00 | (2006.01) |
| B29C 59/02 | (2006.01) |
| B29C 45/37 | (2006.01) |
| B29C 65/48 | (2006.01) |
| B29C 65/00 | (2006.01) |
| B29L 31/34 | (2006.01) |
| B29C 51/10 | (2006.01) |

(52) U.S. Cl.
CPC ............ *F21V 9/14* (2013.01); *B29C 37/0053* (2013.01); *B29C 45/372* (2013.01); *B29C 59/021* (2013.01); *B29C 51/10* (2013.01); *B29C 65/48* (2013.01); *B29C 66/1122* (2013.01); *B29C 66/3032* (2013.01); *B29C 66/30322* (2013.01); *B29C 66/545* (2013.01); *B29C 2059/023* (2013.01); *B29L 2031/3475* (2013.01); *Y10T 156/1028* (2015.01)

(58) Field of Classification Search
CPC .............. G02F 1/1652; B29C 37/0057; B29C 37/0053; B29C 45/372; B29C 59/021; F21V 9/14
USPC ........................................................... 362/19
See application file for complete search history.

(56) References Cited

U.S. PATENT DOCUMENTS

| 3,213,753 | A | * | 10/1965 | Rogers ...................... 359/489.16 |
| 5,046,826 | A | * | 9/1991 | Iwamoto et al. ............... 349/65 |
| 5,422,756 | A | * | 6/1995 | Weber ....................... 359/485.03 |
| 5,844,720 | A | * | 12/1998 | Ohara et al. .................. 359/599 |
| 6,234,639 | B1 | * | 5/2001 | Noguchi ....................... 362/600 |
| 6,332,690 | B1 | * | 12/2001 | Murofushi ......... G02F 1/133305 349/64 |
| 7,494,234 | B2 | * | 2/2009 | Chang .................. G02B 27/285 349/61 |

(Continued)

FOREIGN PATENT DOCUMENTS

| CN | 2416522 Y | 1/2001 |
| CN | 1908753 A | 2/2007 |

(Continued)

*Primary Examiner* — Bryon T Gyllstrom
(74) *Attorney, Agent, or Firm* — Lee & Morse, P.C.

(57) ABSTRACT

A flexible display device includes a flexible display panel, a cover window disposed on an outer side of the flexible display panel, and a polarizing plate disposed between the flexible display panel and the cover window. The cover window includes a protrusion and depression portion having protrusions and depressions formed in an inner surface thereof.

12 Claims, 7 Drawing Sheets

(56) References Cited

U.S. PATENT DOCUMENTS

| | | | |
|---|---|---|---|
| 2007/0139961 A1* | 6/2007 | Cheah et al. | 362/612 |
| 2008/0137200 A1* | 6/2008 | Hsu et al. | 359/599 |
| 2008/0158853 A1* | 7/2008 | Kim et al. | 362/19 |
| 2009/0015758 A1* | 1/2009 | Pei et al. | 349/69 |
| 2011/0286200 A1* | 11/2011 | Iimura | F21V 7/041 362/84 |

FOREIGN PATENT DOCUMENTS

| | | |
|---|---|---|
| CN | 101718918 A | 6/2010 |
| JP | 2008-083423 A | 4/2008 |
| KR | 10-1021061 B1 | 3/2011 |
| TW | 552840 B | 9/2003 |
| TW | 200514490 A | 4/2005 |
| TW | 201236541 A | 9/2012 |

\* cited by examiner (a)

(b)

FLEXIBLE DISPLAY DEVICE AND METHOD OF MANUFACTURING COVER WINDOW OF THE SAME

RELATED APPLICATIONS

This application claims priority to Korean Patent Application No. 10-2012-0130354 filed in the Korean Intellectual Property Office on Nov. 16, 2012, the entire contents of which are hereby incorporated by reference.

BACKGROUND

1. Field

Embodiments relate to a flexible display device using a flexible display panel, and a method for manufacturing a cover window.

2. Description of the Related Art

A flexible display device can display an image on a side surface thereof by using a flexible display device. The flexible display device may be variously applied to mobile equipment such as a mobile phone, an ultra mobile PC, an electric book, an electric newspaper, and the like.

SUMMARY

Embodiments are directed to a flexible display device including a flexible display panel; a cover window disposed on an outer side of the flexible display panel; and a polarizing plate disposed between the flexible display panel and the cover window, and the cover window includes a protrusion and depression portion having protrusions and depressions formed in an inner surface thereof.

The protrusions and depressions may be nanometer-sized.

The flexible display device according to the exemplary embodiment may further include an adhesive layer provided between the polarizing plate and the cover window, and the protrusions and depressions may be press-fitted to the adhesive layer.

The flexible display device according to the exemplary embodiment may further include a support forming curved portions at lateral sides thereof, and attaching the flexible display panel to outer sides of the curved portions.

The protrusion and depression portion may be formed in a bent portion of the cover window corresponding to the curved portion.

A method for manufacturing a cover window of a flexible display device according to another exemplary embodiment forms a cover window having a bent portion by providing a resin to one side of a mold and forms a protrusion and depression portion in an inner surface of the bent portion.

The mold includes a concave first mold and a convex second mold that are coupled to each other, and the cover window having the bent portion may be injection-molded using a melt resin provided in a space formed between the first mold and the second mold.

The protrusion and depression portion may be injection-molded by the melt resin injected to protrusions and depressions formed in a convex portion of the second mold corresponding to the bent portion.

The mold includes a concave first mold and a convex second mold that are coupled to each other, and a sheet provided on the first mold may be pressed by the second mold to press-mold the cover window having the bent portion.

The protrusion and depression portion may be imprinted by pressing the sheet using protrusions and depressions formed in a convex portion of the second mold to correspond to the bent portion.

The cover window having the bent portion may be formed by air pressure forming by pressing a sheet provided to the mold with air pressure.

The protrusion and depression portion may be formed by air pressure forming by pressing the sheet using protrusions and depressions formed in a convex portion of the mold to correspond to the bent portion.

DETAILED DESCRIPTION

Figure 1:
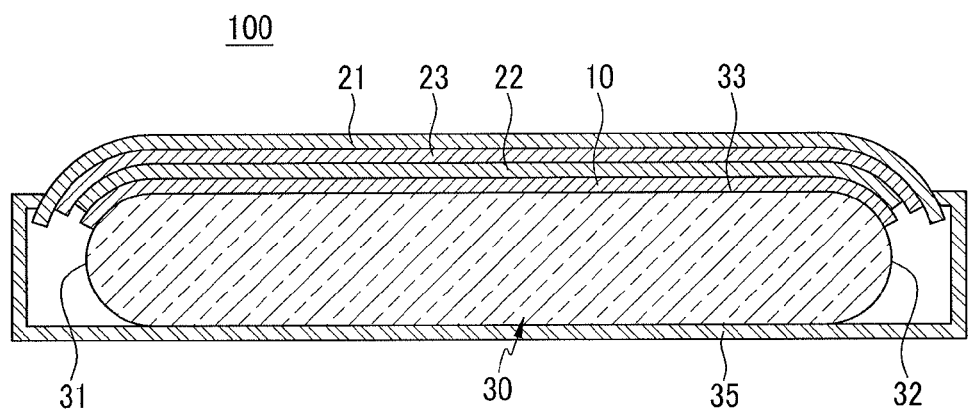
FIG. 1 illustrates a cross-sectional view of a flexible display device according to a first exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The drawings and description are to be regarded as illustrative in nature and not restrictive. Like reference numerals designate like elements throughout the specification. Further, in the drawings, a size and thickness of each element are represented by way of example for better understanding and ease of description, and the embodiments are not limited thereto. The thickness of layers, films, panels, regions, etc., are exaggerated for clarity. In the drawings, for better understanding and ease of description, thicknesses of some layers and areas are excessively displayed. It will be understood that when an element such as a layer, film, region, or substrate is referred to as being "on" another element, it can be directly on the other element or intervening elements may also be present.

FIG. 1 is a cross-sectional view of a flexible display device according to a first exemplary embodiment. Referring to FIG. 1, a flexible display device 100 according to the first exemplary embodiment includes a flexible display panel 10, a cover window 21 overlapping the flexible display panel 10 to protect the flexible display panel 10 from an external impact, and a polarizing plate 22 disposed between the flexible display panel 10 and the cover window 21 to improve visibility of the display device in the external light state by partially absorbing light from the flexible display panel 10.

The flexible display panel 10 includes a flexible film such as a plastic film, and displays an image by arranging an organic light emitting diode and a pixel circuit on the flexible film. The structure of the flexible display panel 10 will be described in detail later.

The cover window 21 is provided in (on) an outer side of an image displaying side of the flexible display panel 10, and is made of a transparent hard material to protect the flexible display panel 10 from an external impact while transmitting the image displayed in the flexible display panel 10. The cover window 21 may have a single-layered or multi-layered structure. FIG. 1 exemplarily illustrates that the cover window 21 has a single-layered structure.

A touch panel 23 that senses touch operation of a user may be provided between the flexible display panel 10 and the cover window 21. For example, the touch panel 23 may be disposed between the polarizing plate 22 and the cover window 21.

The flexible display panel 10, the polarizing plate 22, the touch panel 23, and the cover window 21 may be attached in a layered state to a support 30 and then fixed to a bracket 35. The bracket 35 fixes the support 30 and the flexible display panel 10, the polarizing plate 22, the touch panel 23, and the cover window 21 attached to the support 30 by surrounding the outer edges thereof.

In this case, the flexible display panel 10, the polarizing plate 22, the touch panel 23, and the cover window 21 are attached to each other in a state of being bent at lateral sides of the support 30. For convenience, adhesive layers respectively provided between the flexible display panel 10, the polarizing plate 22, the touch panel 23, the cover window 21, and the support 30 are omitted.

The support 30 is formed to firmly maintain the bent state of the flexible display panel 10, the polarizing plate 22, the touch panel 23, and cover window 21 that are layered on the support 30. The support 30 is formed in the shape of a plate received in the bracket 35, and forms curved portions 31 and 32 at lateral sides thereof and thus may be fixed to the bracket 35 by an additional fixing member (not shown).

The flexible display panel 10 provided in an outer side of the support 30 is attached to a plane 33 and at the same time attached to the curved portions 31 and 32 that are convex to the outer side at lateral ends thereof. Thus, the flexible display panel 10 may display an image in the plane 33 and the curved portions 31 and 32 of the support 30.

Although it is not illustrated, a printed circuit board and a battery for driving of the flexible display panel 10 may be provided between the bracket 35 and the support 30.

Figure 2:
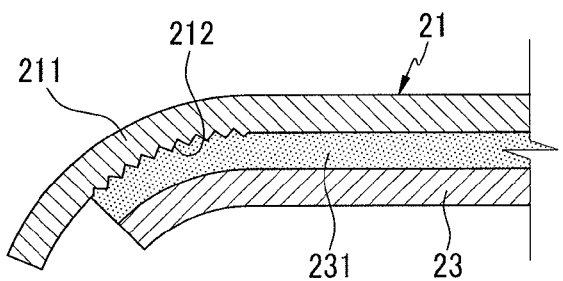
FIG. 2 illustrates a detailed view of a bent portion of a cover window of FIG. 1.

FIG. 2 illustrates a detailed view of a bent portion of the cover window of FIG. 1. Referring to FIG. 2, the cover window 21 forms a bent portion 211 corresponding to the curved portions 31 and 32 and includes a protrusion and depression portion 212 in an inner side of the bent portion 211. The protrusions and depressions are nanometer-sized (e.g., having a height/depth of less than 1 micron), and do not interrupt light transmission from the flexible display panel 10 to the cover window 21.

The protrusions and depressions of the protrusion and depression portion 212 may be press-fitted to the adhesive layer 231 so that attachment strength with the adhesive layer 231 and surface energy can be reinforced. In FIG. 1 and FIG. 2, the adhesive layer 231 is provided between the cover window 21 and the touch panel 23. Although it is not shown, the adhesive layer may be provided between the cover window and the polarizing plate if no touch panel is provided.

Since the protrusion and depression portion 212 formed in the inner surface of the bent portion 211 of the cover window 21 is press-fitted to the adhesive layer 231 and thus attached to the touch panel 23, the bent portions 211 in the curved portions 31 and 32 can be firmly attached to the touch panel 23. That is, the attachment strength and the surface energy are reinforced in the bent portion 211. Accordingly, thermal deformation in the bent portion 211 is reduced, and repulsive force and lifting can be minimized, thereby controlling contraction force.

Hereinafter, various methods for manufacturing a cover window that forms the protrusion and depression portion 212 in the inner surface of the bent portion 211 of the cover window 21 will be described.

According to the various methods for manufacturing the cover window of the flexible display device, described hereinafter, the cover window 21 having the bent portion 211 is molded by providing a resin in one surface of a mold. In addition, the protrusion and depression portion 211 is molded in the inner surface of the bent portion 211 in order to reinforce attachment strength and surface energy of the bent portion 211.

Figure 3:
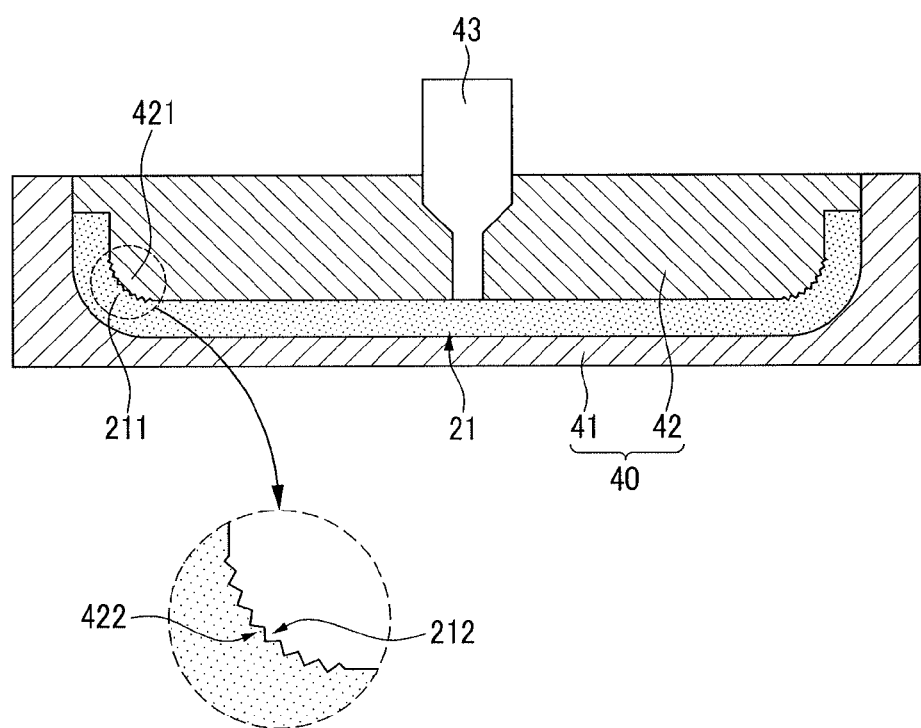
FIG. 3 illustrates a cross-sectional view during a manufacturing process of the cover window of the flexible display device of FIG. 1.
Figure 4:
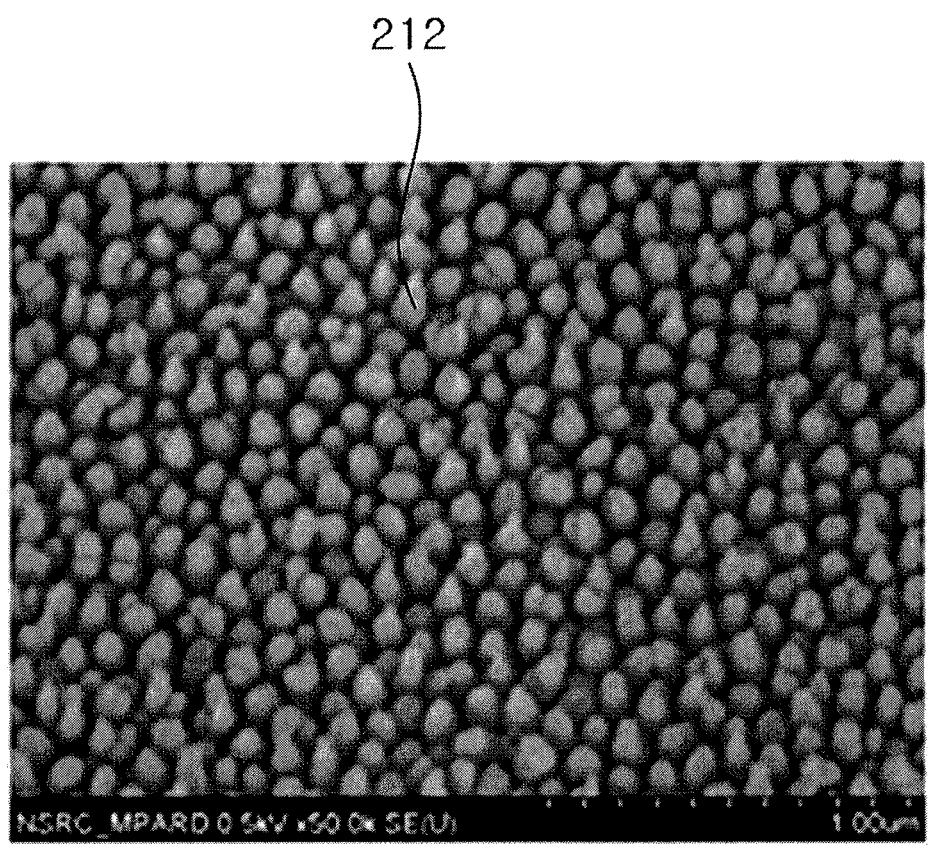
FIG. 4 illustrates an image of protrusion and depression portions formed in the bent portion of FIG. 3.

FIG. 3 illustrates a cross-sectional view during a method for manufacturing the cover window of the flexible display device of FIG. 1, and FIG. 4 is an image illustrating the protrusion and depression portion formed in the bent portion of FIG. 3.

Referring to FIG. 3 and FIG. 4, a mold 40 includes a first mold 41 and a second mold 42 that are coupled to each other to form a space therebetween. An injection hole 43 for injection of a melt resin is provided in the second mold 42.

The method for manufacturing the cover window according to the first exemplary embodiment injects a melt resin through the injection hole 43 and forms the cover window 21 having the bent portion 211 by injection molding using the melt resin filled in the space between the first mold 41 and the second mold 42.

The second mold 42 has a convex portion 421 corresponding to the bent portion 211, and protrusions and depressions 422 are formed in the convex portion 421. Through the injection of the melt resin, the protrusion and depression portion 212 is injection-molded in the inner surface of the bent portion 211 by the protrusions and depressions 422 formed in the convex portion 421.

The protrusion and depression portion 212 reinforces the surface energy in the bent portion 211 and attachment strength with the adhesive layer 231. Thus, the cover window 21 can minimize repulsive force and lifting occurring in the bent portion 211. In addition, the bent portion 211 can further suppress reflection of external light by the protrusion and depression portion 212.

Hereinafter, various exemplary embodiments of methods for manufacturing the cover window will be described. Hereinafter, the duplication description for the same configuration as the first exemplary embodiment and the above-described exemplary embodiment will not be repeated.

Figure 5:
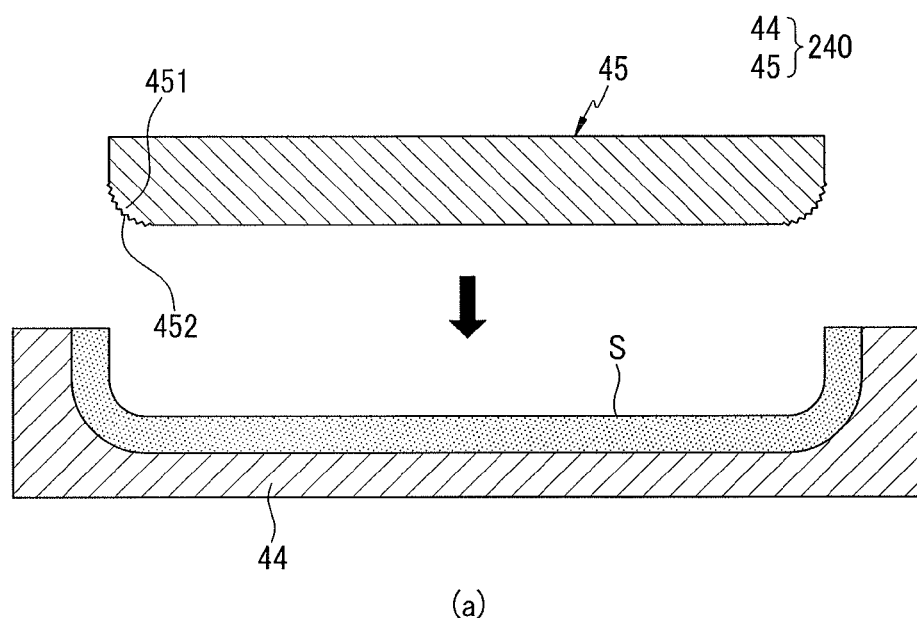
FIGS. 5A and 5B illustrate cross-sectional views during a process for manufacturing a cover window of a flexible display device according to a second exemplary embodiment.
Figure 5:
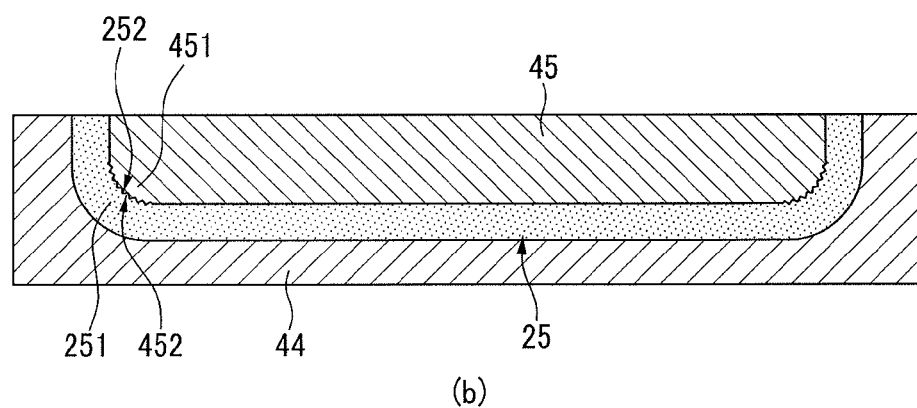

FIGS. 5A and 5B illustrate cross-sectional views during a method for manufacturing a cover window of a flexible display device according to a second exemplary embodiment. Referring to FIG. 5, a mold 240 includes a concave first mold 44 and a convex second mold 45. The first mold 44 and the second mold 45 are coupled to each other.

According to the method for manufacturing the cover window of the second exemplary embodiment, a cover window 25 having a bent portion 251 is press-molded by injecting (providing) a sheet S (FIG. 5A) to the first mold 44 and pressing the sheet S (FIG. 5B) with the second mold 45.

The second mold 45 includes a convex portion 451 corresponding to the bent portion 251, and protrusions and depressions 452 are formed in the convex portion 451. As the sheet S is pressed, the protrusion and depression portion 252 is imprinted to the inner surface of the bent portion 251 by the protrusions and depressions 452 formed in the convex portion 451.

Figure 6:
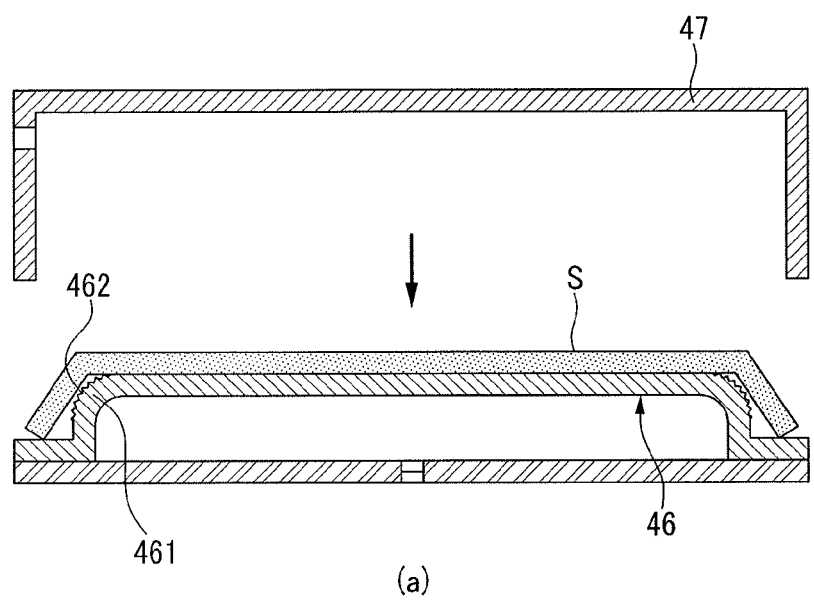
FIGS. 6A and 6B illustrate cross-sectional views during a process for manufacturing a cover window of a flexible display according to a third exemplary embodiment.
Figure 6:
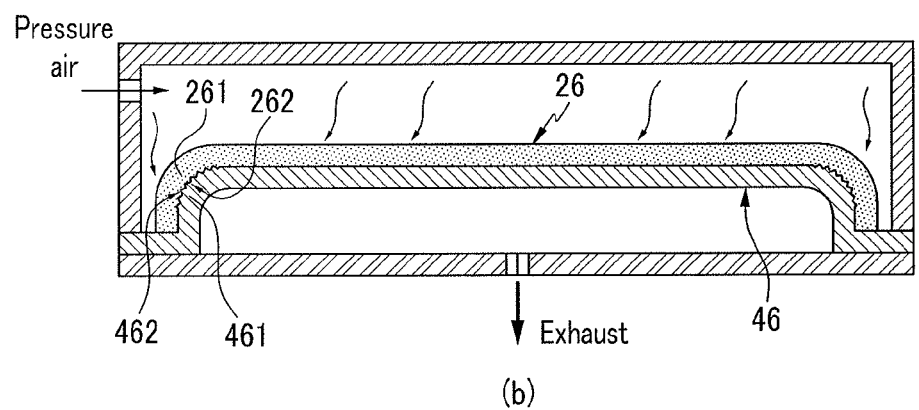

FIGS. 6A and 6B illustrate cross-sectional views of a method for manufacturing a cover window of a flexible display device according to a third exemplary embodiment. Referring to FIG. 6, a mold 46 is convex-shaped, and may be received in a pressure chamber 47.

According to the method for manufacturing the cover window of the third exemplary embodiment, a sheet S is injected (provided) to the mold 46 (FIG. 6A) and the sheet S is pressed with air pressure to mold a cover window 26 having a bent portion 261 by air pressure forming (FIG. 6B).

The pressure chamber 47 receives the mold 46 where the sheet S is placed to form a pressure space for pressing the sheet S with pressured air. The mold 46 is provided with a convex portion 461 corresponding to the bent portion 261, and protrusions and depressions 462 are formed in the convex portion 461.

As the air presses the sheet S, a protrusion and depression portion 262 is formed by air pressure forming in the inner surface of the bent portion 261 by the protrusion and depression portion 462 formed in the convex portion 461.

In air pressure forming, air is exhausted through an exhaust hole 463 of the mold 46 to vacuum the sheet S, and then the sheet S is closely attached to the mold 46 such that vacuum molding can be simultaneously performed. Accordingly, air pressure forming property of the sheet S on the mold 46 can be improved.

The sheet S is heated and softened in the previous process and then injected to the mold 46 such that air pressure forming can be performed using the pressure air. The air pressure formed cover window 26 is cooled in the post process and then separated from the mold 46.

Hereinafter the flexible display panel 10 disposed in the outer side of the support will be exemplarily described.

Figure 7:
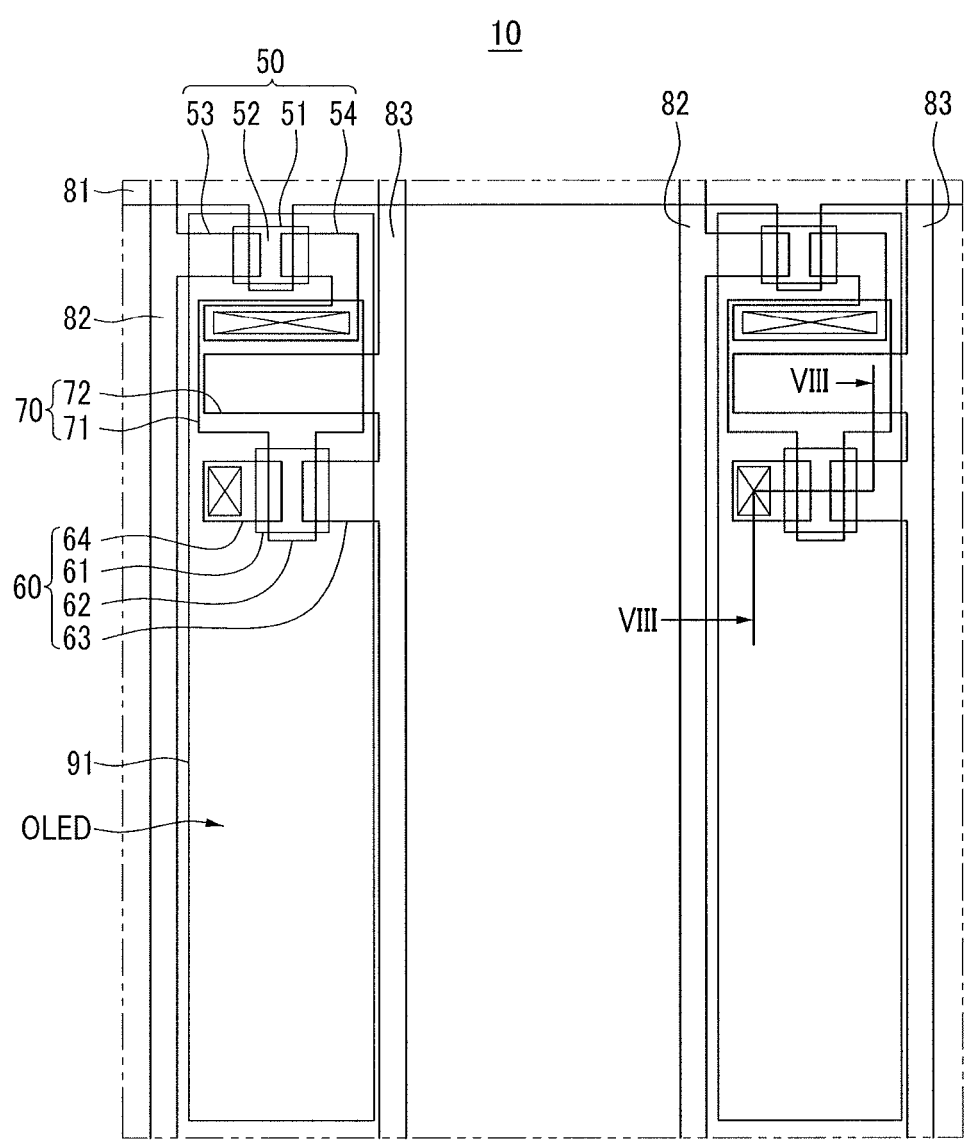
FIG. 7 illustrates a layout view of a pixel structure of a flexible display panel of FIG. 1.
Figure 8:
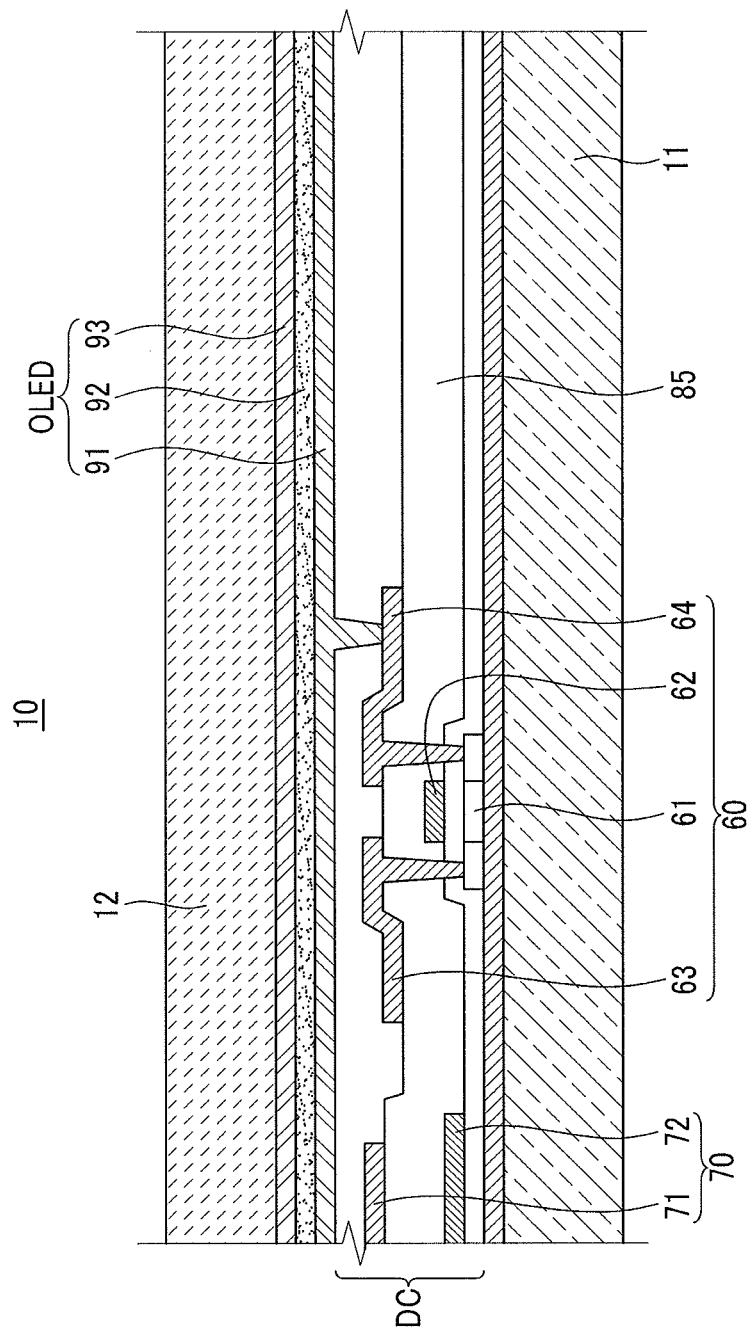
FIG. 8 illustrates a cross-sectional view of the flexible display panel of FIG. 7, taken along the line VIII-VIII.

FIG. 7 illustrates a layout view of a pixel structure of the flexible display panel shown in FIG. 1, and FIG. 8 is a cross-sectional view of the flexible display panel of FIG. 7, taken along the line VIII-VIII. The structure of the flexible display panel 10 is not restrictive, and may be formed as an organic light emitting diode display or a flexible liquid crystal display.

Referring to FIG. 7 and FIG. 8, the flexible display panel 10 includes a pixel circuit DC and an organic light emitting diode OLED formed in each pixel. The pixel circuit DC basically includes a switching thin film transistor 50, a driving thin film transistor 60, and a capacitor 70. In addition, the flexible display panel 10 includes a gate line 81 extended along one direction, a data line 82, and a common power line 83. The data line 82 and the common power line 83 cross the gate line 81 in an insulated manner.

Here, one pixel may be defined by a boundary of the gate line 81, the data line 82, and the common power line 83, but is not necessarily limited thereto. The pixel means a basic unit that displays an image. The flexible display panel 10 displays an image through a plurality of pixels.

In FIG. 5, an active matrix flexible display panel 10 of a 2Tr-1Cap structure in which two thin film transistors 50 and 60 and one capacitor 70 are provided in one pixel is illustrated. However, the structure of the flexible display panel 10 is not limited to the illustrated example. The flexible display panel 10 may include no less than three thin film transistors and no less than two capacitors. An additional wire may be further formed in the flexible display panel 10 so that the flexible display panel 10 may have various structures.

The organic light emitting diode OLED includes a pixel electrode 91, an organic emission layer 92, and a common electrode 93. One of the pixel electrode 91 and the common electrode 93 is a hole injection electrode and the other is an electron injection electrode. Light is emitted when electrons and holes are injected from the pixel electrode 91 and the common electrode 93 into the organic emission layer 92 and exciton in which the holes and the electrons are combined with each other is reduced from an exited state to a base state.

The organic emission layer 92 is made of a low polymer organic material or a high polymer organic material such as poly3,4-ethylene dioxythiophene (PEDOT). In addition, the organic emission layer 92 may be formed as a multilayer including at least one of an emission layer, a hole injection layer (HIL), a hole transporting layer (HTL), an electron transporting layer (ETL), and an electron injection layer (EIL). When the multilayer includes all of the emission layers HIL, HTL, ETL, and EIL, the HIL is disposed on the pixel electrode 91, which is a positive electrode, and the HTL, the emission layer, the ETL, and the EIL are sequentially stacked thereon.

The organic emission layer 92 may include a red color organic emission layer emitting light of a red color, a green organic emission layer emitting light of a green color, and a blue organic emission layer emitting light of a blue color, and the red organic emission layer, the green organic emission layer, and the blue organic emission layer are respectively formed in a red color pixel, a green color pixel, and a blue color pixel to realize a colored image.

In addition, the organic emission layer 92 layers the red organic emission layer, the green organic emission layer, and the blue organic emission layer together in the red color pixel, the green color pixel, and the blue color pixel, and a red color filter, a green color filter, and a blue color filter are provided in the respective pixels to realize a colored image. Alternatively, a white organic emission layer emitting light of a white color is formed all in the red color pixel, the green color pixel, and the blue color pixel, and a red color filter, a green color filter, and a blue color filter are provided in the respective pixels to realize a colored image. When a colored image is realized using the white organic emission layer and color filters, deposition masks for deposition of the red organic emission layer, the green organic emission layer, and the blue organic emission layer to the respective pixels, that is, the red color pixel, the green color pixel, and the blue color pixels are not needed.

In other examples, it is a matter of course that the white organic emission layer may be formed as one organic emission layer, and the white organic emission layer includes a configuration capable of emitting white light by stacking the plurality of organic emission layers. For example, the white organic emission layer may also include a configuration capable of emitting light of a white color by combining at least one yellow organic emission layer and at least one blue organic emission layer, a configuration capable of emitting light of a white color by combining at least one cyan organic emission layer and at least one red organic emission layer, and a configuration capable of emitting light of a white color by combining at least one magenta organic emission layer and at least one green organic emission layer.

The pixel electrode 91 is formed of a metal having high reflectance and the common electrode 93 may be formed of a transparent conductive layer. In this case, the light of the organic emission layer 92 is reflected by the pixel electrode 91 and transmits the common electrode 93 and an encapsulation substrate 12 to be emitted to the outside. In FIG. 8, reference numeral 11 denotes a flexible substrate.

The capacitor 70 a pair of capacitor electrodes 71 and 72 disposed with an interlayer insulating layer 85 as a dielectric material interposed therebetween. Capacitance of the capacitor 70 is determined by a voltage between an electric charge charged in the capacitor 70 and a voltage between the two capacitor electrodes 71 and 72.

The switching thin film transistor 50 includes a switching semiconductor layer 51, a switching gate electrode 52, a switching source electrode 53, and a switching drain electrode 54. The driving thin film transistor 60 includes a driving semiconductor layer 61, a driving gate electrode 62, a driving source electrode 63, and a driving drain electrode 64.

The switching semiconductor layer 51 and the driving semiconductor layer 61 may be formed of a polysilicon or oxide semiconductor. The oxide semiconductor may include at least one of oxides based on titanium (Ti), hafnium (Hf), zirconium (Zr), aluminum (Al), tantalum (Ta), germanium (Ge), zinc (Zn), gallium (Ga), tin (Sn), or indium (In) and complex oxides thereof, such as zinc oxide (ZnO), indium-gallium-zinc oxide (InGaZnO4), indium-zinc oxide (Zn—In—O), zinc-tin oxide (Zn—Sn—O), indium-gallium oxide (In—Ga—O), indium-tin oxide (In—Sn—O), indium-zirconium oxide (In—Zr—O), indium-zirconium-zinc oxide (In—Zr—Zn—O), indium-zirconium-tin oxide (In—Zr—Sn—O), indium-zirconium-gallium oxide (In—Zr—Ga—O), indium-aluminum oxide (In—Al—O), indium-zinc-aluminum oxide (In—Zn—Al—O), indium-tin-aluminum oxide (In—Sn—Al—O), indium-aluminum-gallium oxide (In—Al—Ga—O), indium-talaum oxide (In—Ta—O), indium-tantalum-zinc oxide (In—Ta—Zn—O), indium-tantalum-tin oxide (In—Ta—Sn—O), indium-tantalum-gallium oxide (In—Ta—Ga—O), indium-germanium oxide (In—Ge—O), indium-germanium-zinc oxide (In—Ge—Zn—O), indium-germanium-tin oxide (In—Ge—Sn—O), indium-germanium-gallium oxide (In—Ge—Ga—O), titanium-indium-zinc oxide (Ti—In—Zn—O), and hafnium-indium-zinc oxide (Hf—In—Zn—O).

The switching semiconductor layer 51 and the driving semiconductor layer 61 each include a channel region not doped with impurities and source and drain regions doped with impurities and formed at both sides of the channel region. Here, the impurity is changed according to the type of a thin film transistor, and N-type impurities or P-type impurities are applicable.

When the switching semiconductor layer 51 and the driving semiconductor layer 61 are formed of oxide semiconductors, an additional protection layer may be added to protect the oxide semiconductor that is weak to external environment, e.g., a high temperature.

The switching thin film transistor 50 is used as a switch to select a pixel for light emission. The switching gate electrode 52 is connected to the gate line 81. The switching source electrode 53 is connected to the data line 82, and the switching drain electrode 54 is connected to one capacitor electrode 71.

The driving thin film transistor 60 applies a driving power for light emission of an organic emission layer 92 of the selected pixel to the pixel electrode 91. The driving gate electrode 62 is connected with the capacitor electrode 71 connected with the switching drain electrode 54. The driving source electrode 63 and the other capacitor electrode 72 are connected with the common power line 83. The driving drain electrode 64 is connected with the pixel electrode 91 of the organic light emitting diode ILED through a contact hole.

The switching thin film transistor 50 is driven by a gate voltage applied to the gate line 81 to transmit a data voltage applied to the data line 82 to the driving thin film transistor 60. A voltage corresponding to a difference between a common voltage applied to the driving thin film transistor 60 from the common power line 83 and the data voltage transmitted from the switching thin film transistor 50 is stored in the capacitor 70, and a current corresponding to the voltage stored in the capacitor 70 flows to the organic light emitting diode OLED through the driving thin film transistor 60 such that the organic emission layer 92 emits light.

By way of summary and review, a flexible display device may be provided with a cover window layered in the topmost to protect the flexible display panel, and a polarizing plate may be provided between the cover window and the flexible display panel to partially absorb light incident from the flexible display panel so that visibility can be improved in the external light state.

To form the flexible display device, the cover window may have a predetermined curvature radius to correspond to a curvature radius of a support, the polarizing plate may be laminated to an inner side of the bent cover window, the flexible display panel may be attached to an inner side of the polarizing plate, and the flexible display panel may be attached to the support.

For example, the cover window may be injection molded using an in-mold lamination method. When the cover window is injection molded, the cover window may be molded without considering repulsive force of a polarizing plate and a flexible display panel at a bent portion. Accordingly the repulsive force may increased due to a deformation difference in a bent portion of each of the cover window, the polarizing plate, and the flexible display panel, and the bent portion is being lifted due to a contraction force difference between the respective layers. The repulse force may be increased and the lifting phenomenon may be more severe as the radius of the bent portion is decreased.

The flexible display device and method of manufacturing a cover window of the same according to the embodiments may allow for the above-described issues to be substantially avoided, e.g., by minimize repulsive force and lifting in a bent portion of a cover window. According to the exemplary embodiments, attachment strength and surface energy in the bent portion of the cover window can be reinforced by forming protrusions and depressions in the bent portion of the cover window. Accordingly, thermal deformation in the bent portion can be reduced, the repulse force and lifting phenomenon in the bent portion can be minimized, and a contraction force can be controlled.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A flexible display device, comprising:
   a flexible display panel, the flexible display panel having a first surface for displaying an image;
   a cover window disposed on the first surface and an outer side of the flexible display panel; and
   a polarizing plate disposed between the flexible display panel and the cover window,
   wherein the cover window includes a protrusion and depression portion having protrusions and depressions formed in an inner surface thereof,
   wherein the cover window includes a bent portion corresponding to the outer side of the flexible display panel and a flat portion corresponding to the first surface of the flexible display panel, and
   wherein the protrusion and depression portion is formed only in the bent portion of the cover window.

2. The flexible display device of claim 1, further comprising an adhesive layer between the polarizing plate and the cover window, wherein the protrusions and depressions are press-fitted to the adhesive layer.

3. The flexible display device of claim 1, further comprising a support including curved portions at lateral sides thereof, wherein the flexible display panel is attached to outer sides of the curved portions.

4. The flexible display device of claim 3, wherein the bent portion corresponds to one of the curved portions.

5. The flexible display device of claim 1, wherein the protrusions and depressions are nanometer-sized and transmit all incident light.

6. A method of manufacturing a cover window of a flexible display device, the method comprising:
   forming a cover window having a bent portion at an edge of the cover window and a flat portion at a center of the cover window by providing a resin to one side of a mold; and
   forming a protrusion and depression portion in an inner surface of the bent portion such that protrusions and depressions of the protrusion and depression portion are nanometer-sized,
   wherein the protrusions and depressions transmit all incident light, and
   wherein the protrusion and depression portion is formed only in the bent portion of the cover window.

7. The method for manufacturing the cover window of claim 6, wherein:
   the mold includes a concave first mold and a convex second mold that are coupled to each other, and
   the cover window having the bent portion is injection-molded using a melt resin provided in a space formed between the concave first mold and the convex second mold.

8. The method for manufacturing the cover window of claim 7, wherein the protrusion and depression portion is injection-molded by the melt resin being injected to protrusions and depressions formed in a convex portion of the convex second mold corresponding to the bent portion.

9. The method for manufacturing the cover window of claim 6, wherein:
   the mold includes a concave first mold and a convex second mold that are coupled to each other, and
   a sheet provided in the concave first mold is pressed by the convex second mold to press-mold the cover window having the bent portion.

10. The method for manufacturing the cover window of claim 9, wherein the protrusion and depression portion is imprinted by pressing the sheet using protrusions and depressions formed in a convex portion of the convex second mold corresponding to the bent portion.

11. The method for manufacturing the cover window of claim 6, wherein the cover window having the bent portion is formed by air pressure forming such that the air pressure forming includes pressing a sheet provided on the mold with air pressure.

12. The method for manufacturing the cover window of claim 11, wherein the protrusion and depression portion is formed by air pressure forming such that the air pressure forming includes pressing the sheet onto protrusions and depressions formed in a convex portion of the mold corresponding to the bent portion.

* * * * *